Aug. 21, 1951     A. WITTLIN ET AL     2,565,416
DEHYDRATION OF REFRIGERATION SYSTEMS
Filed Sept. 30, 1949
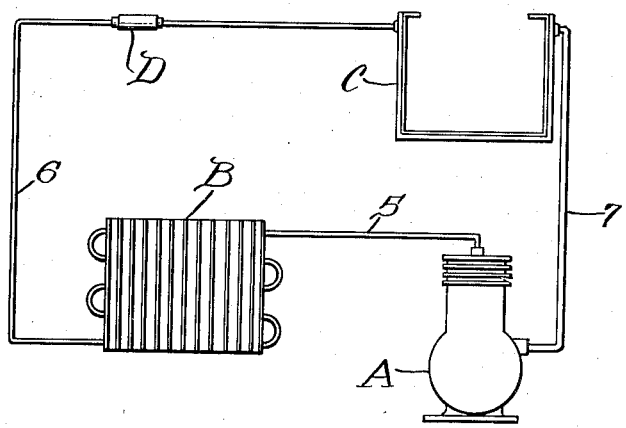
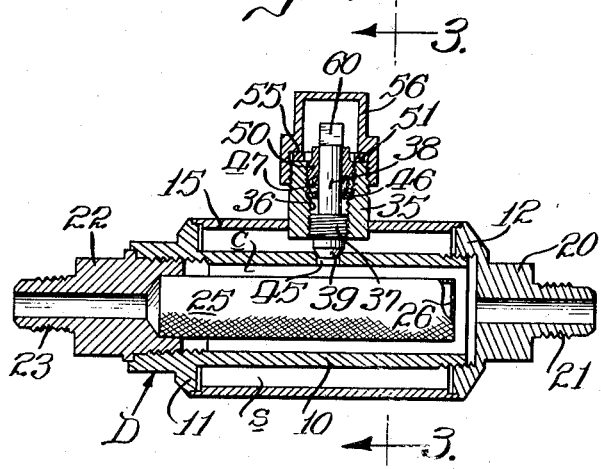
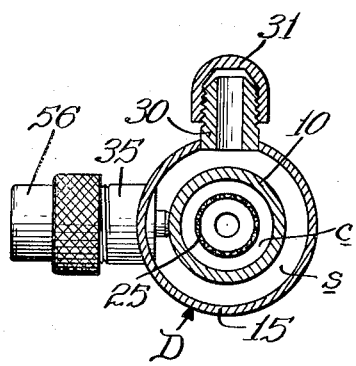
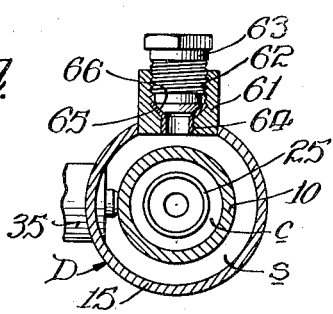
INVENTORS.
Albert Wittlin
BY Rollin H. Lacart Patented Aug. 21, 1951

2,565,416

UNITED STATES PATENT OFFICE 2,565,416

DEHYDRATION OF REFRIGERATION SYSTEMS

Albert Wittlin and Rollin H. Lacart, Chicago, Ill.; said Lacart assignor to said Wittlin Application September 30, 1949, Serial No. 118,864

3 Claims. (Cl. 62—117.85)

This invention relates to a means by which to dehydrate a refrigerating system so that moisture present in the refrigerant may be rendered inert.

At present the dehydrators used for this purpose involve a considerable loss in time for their use. The system must often be drained, or at least shut down, and the expense thereof resulting from stoppage of operation becomes a highly deterrent factor.

According to the apparatus of this invention, dehydration may take place with no stoppage in the operation of the system. The time required for the operation is but very slight, and any competent person versed in refrigeration practice or theory may readily follow the necessary instructions to do the job satisfactorily. In addition, the means employed is simple, inexpensive, and may be part of the permanent installation so as to be always ready for operation when occasion may require.

A suggestive embodiment of this invention is set forth in the accompanying drawing wherein—

Figure 1 is a diagrammatic view of a refrigeration system incorporating the usual operating units and also the dehydrator of this invention;

Fig. 2 is a longitudinal sectional view through the dehydrator per se;

Fig. 3 is a transverse section therethrough, taken on line 3—3 of Fig. 2; and

Fig. 4 which is a view similar to Fig. 3 shows a modified construction.

In the showing of Fig. 1 there is a compressor A from which the refrigerant is pumped under pressure through a pipeline 5 to a condenser B. A pipeline 6 extends from the condenser through to an evaporator C and from thence another pipeline 7 leads back to the compressor. The dehydrator D embodying the features of this invention may be interposed at any one of various places in the system, but preferably in the pressure line 6 between the condenser and the evaporator, as shown.

Coming now to Fig. 2, the dehydrator comprises a tubular body 10 defining a mixing chamber $c$. Near one end of the tubular body is an annular flange 11 and at its opposite end exterior threads for attachment thereto of a collar 12. Between the collar and flange 11 is a circular casing 15 in fluid-tight connection with each to provide interiorly thereof a supply chamber $s$ which surrounds the body.

With the collar is associated a polygonal body 20 terminating in a threaded nipple 21 for fluid-tight connection with an approved coupler (not shown) in the refrigeration line. The tubular body at its remote end extends beyond the flange 11 and is interiorly threaded to receive one end of a plug 22 formed at its outer end with a nipple 23 to coact with a coupling (not shown) to produce a liquid-tight connection in the fluid system. The body 20 and plug 22 are provided with axial passages so that the refrigerant may circulate freely therethrough and through the mixing chamber $c$. The plug 22 at the inlet end of the dehydrator is enlarged interiorly to accommodate one end of an elongated tubular screen 25 which is securely fixed therein. This screen extends for the major portion of the length of the mixing chamber and at its free end is closed by a fine-mesh wall 26. Solid particles (if any) within the refrigerant will be trapped by this screen when passing therethrough. If necessary, the plug, together with the tubular screen carried thereby, may be disconnected from the tubular body thereby making the screen accessible for cleaning or replacement.

There is formed in the casing 15, at a point medially of its length, an opening wherein is fixedly connected an upstanding nipple 30 which is externally threaded at its outer end to receive a closure cap 31. When the cap is removed, access is afforded to the supply chamber $s$ surrounding the tubular body 10, and a supply of dehydrant may then be introduced therein.

At a second point in the casing 15 we have provided another nipple 35 which is fixedly secured to extend laterally outwardly therefrom. This nipple is internally threaded at 36 for coacting with threads 37 which outstand from a valve stem 38 whose inner end is tapered at 39 for seating within a port 45 that is formed in the tubular wall 10. The stem 38 is extended outwardly through the nipple 35 past a washer 46 and an annular packing body 47 which is confined between the stem and the threaded walls of an enlarged chamber at the outer end of the nipple. A gland nut 50 which is threaded into this chamber is adapted to maintain the packing under pressure whereby to establish a seal around the stem. In addition, a gasket 51 is disposed at the end of the nipple to receive pressure from a shoulder 55 provided at the base of a cap 56 whose inner end is enlarged to fit over the nipple and coact with the threads formed exteriorly thereof. The outer end of the stem 38 is polygonally formed at 60 to facilitate rotation thereof in response to a torsional force imparted by a tool.

In the normal use of the refrigeration system the stem 38 is maintained in the advanced position shown in Fig. 3 where its tapered end remains seated in the port 45. When so positioned, liquid is prevented from passing outwardly from the mixing chamber c or from passing inwardly from the supply chamber s. Each is cut off from the other. The space within the supply chamber may remain empty or be filled so as to exclude air therefrom. If the refrigerant in the system is to be dehydrated, then the cap 56 is first removed and the stem 38 retracted very slightly to permit dehydrant within the supply chamber s to be drawn into the mixing chamber c to join the refrigerant passing therethrough. A very fine adjustment of the stem may be attained, if desired. The stream of refrigerant moving past the port 45 acts as an aspirator to induce dehydrant to thus enter the mixing chamber.

Obviously, if the quantity of dehydrant within the supply chamber s is insufficient to accomplish the dehydration desired, the stem 38 may be advanced to closed position, whereupon the cap 31 is removed to permit more of the dehydrant to be introduced into the chamber. When this has been done and the cap 31 replaced, it will then be safe to retract the stem 38 once more to the distance desired for release of dehydrant into the refrigerant passing through the mixing chamber c. In this way the control of the dehydrant into the system may be maintained without any danger of the refrigerant itself escaping from the system.

In Fig. 4 we have shown a slight modification in the fitting which connects with the supply chamber. Here we provide a nipple 61 affixed to the casing 15, the nipple being internally threaded at 62 to receive a closure plug 63. At its inner end, the nipple is reduced interiorly and formed with a conical seat for receiving a tubular insert 64 of soft material such as brass. The outer end of this insert is flared outwardly to rest against the conical seat and be itself engaged by the tapered inner end 66 of the plug 63 to provide a tight seal at this point. Such a fitting is advantageous for use with couplings of certain types when connection is to be established with a source of supply for replenishment of the dehydrant within the supply chamber s.

We claim:

1. A dehydrating apparatus comprising a tubular body providing a mixing chamber and forming a passage through it for a refrigerant and provided at its ends with means for incorporating it in a refrigeration system wherein refrigerant is circulated under pressure, a casing surrounding the body in spaced relation thereto and defining therewith an annular chamber for a supply of dehydrant, the casing being provided with an opening therein together with a removable plug therefor which, when removed, provides an inlet for admission of dehydrant to the chamber, the wall of the tubular body being provided with a port communicating with the mixing chamber and with the annular supply chamber for admitting dehydrant therefrom into the interior of the tubular body for admixture with the refrigerant when circulating therethrough, and a valve movable toward and from the port for closing and opening the same whereby to shut off communication through the port or establishing communication therethrough in a varying degree, the port, when open, confronting the moving stream of refrigerant passing through the tubular body to provide an aspirator for drawing dehydrant from the supply chamber into the mixing chamber for admixture with said refrigerant, said valve, when closed, operating to shut off communication between the supply chamber and the interior of the tubular body, whereby dehydrant may be introduced into the supply chamber through the inlet opening thereof while the refrigeration system is in normal operation without escape of the refrigerant.

2. A dehydrating apparatus comprising a tubular body provided at its ends with means for incorporating it into a refrigeration system and providing a passage through it for a refrigerant and forming a mixing chamber interiorly thereof, a casing surrounding the tubular body in spaced relation thereto and defining therewith an annular chamber surrounding the mixing chamber for containing a supply of dehydrant, there being a port through the wall of the tubular body confronting the moving stream of ferigerant passing therethrough and communicating with the surrounding annular chamber, means through which a supply of dehydrant may be introduced into the annular chamber, and a valve movable toward and from the port to close and open the same, whereby to permit dehydrant within the chamber, when the valve is open, to pass through the port and into the tubular body in response to aspiration produced by the refrigerant passing therethrough, said valve, when closed, operating to shut off communication between the supply chamber and the tubular body, whereby dehydrant may be introduced into the supply chamber while the refrigeration system is in normal operation without escape of refrigerant.

3. A dehydrating apparatus comprising a tubular body provided at its ends with means for incorporating it into a refrigeration system and providing a passage through it for a refrigerant and forming a mixing chamber interiorly thereof, a casing arranged exteriorly of the tubular body and having a chamber for a supply of dehydrant, there being a port through the wall of the tubular body confronting the stream of refrigerant passing through the body and communicating with the casing chamber, means through which a supply of dehydrant may be introduced into the casing chamber, and a valve movable toward and from the port to close and open the same whereby to permit dehydrant within the casing chamber, when the valve is open, to pass through the port and into the tubular body in response to aspiration produced by the refrigerant passing through the body, said valve, when closed, operating to shut off communication between the supply chamber and the tubular body whereby dehydrant may be introduced into the supply chamber while the refrigeration system is in normal operation without escape of refrigerant.

ALBERT WITTLIN.
ROLLIN H. LACART.

REFERENCES CITED

The following references are of record in the file of this patent:

UNITED STATES PATENTS

| Number | Name | Date |
|---|---|---|
| 1,466,072 | Todd | Aug. 28, 1923 |
| 2,131,854 | Anderson et al. | Nov. 28, 1939 |
| 2,225,990 | Henry | Dec. 24, 1940 |
| 2,260,603 | Cormack | Oct. 28, 1941 |
| 2,430,692 | Touborg | Nov. 11, 1947 |